US011727192B2

United States Patent
Jindal et al.

(10) Patent No.: US 11,727,192 B2
(45) Date of Patent: Aug. 15, 2023

(54) FONT CUSTOMIZATION BASED ON STROKE PROPERTIES

(71) Applicant: Adobe Inc., San Jose, CA (US)

(72) Inventors: Nipun Jindal, Delhi (IN); Pramendra Rathi, Uttar Pradesh (IN); Tanya Jindal, Delhi (IN); Deep Sinha, Uttar Pradesh (IN)

(73) Assignee: ADOBE INC., San Jose, CA (US)

( * ) Notice: Subject to any disclaimer, the term of this patent is extended or adjusted under 35 U.S.C. 154(b) by 143 days.

(21) Appl. No.: 17/191,529

(22) Filed: Mar. 3, 2021

(65) Prior Publication Data

US 2022/0284169 A1   Sep. 8, 2022

(51) Int. Cl.
| | | |
|---|---|---|
| *G06F 17/00* | (2019.01) | |
| *G06F 40/109* | (2020.01) | |
| *G06F 3/04847* | (2022.01) | |
| *G06F 40/171* | (2020.01) | |
| *G06V 30/32* | (2022.01) | |

(52) U.S. Cl.
CPC ........ *G06F 40/109* (2020.01); *G06F 3/04847* (2013.01); *G06F 40/171* (2020.01); *G06V 30/347* (2022.01)

(58) Field of Classification Search
CPC .. G06F 40/109; G06F 40/171; G06F 3/04847; G06F 3/04883; G06F 3/04817; G06F 3/0482; G06V 30/347
USPC ........................................................ 715/269
See application file for complete search history.

(56) References Cited

U.S. PATENT DOCUMENTS

| | | | |
|---|---|---|---|
| 9,620,086 B1 * | 4/2017 | Joshi | G09G 5/28 |
| 2017/0109034 A1 * | 4/2017 | Wang | G06F 40/109 |
| 2019/0354261 A1 * | 11/2019 | Zhao | G06V 30/19173 |
| 2021/0012547 A1 * | 1/2021 | Kumawat | G06T 3/0093 |
| 2021/0133477 A1 * | 5/2021 | Dhanuka | G06V 30/1823 |
| 2021/0303836 A1 * | 9/2021 | Kasatani | G06F 3/04883 |

OTHER PUBLICATIONS

Azadi, Samaneh, et al., "Multi-Content GAN for Few-Shot Font Style Transfer", Available Online at https://arxiv.org/abs/1712.00516, Dec. 1, 2017, pp. 1-16.
Sudarma, Made, et al. "The Thinning Zhang-Suen Application Method in the Image of Balinese Scripts on the Papyrus", International Journal of Computer Applications (0975-8887), vol. 91, No. 1, Apr. 2014, pp. 9-13.

\* cited by examiner

*Primary Examiner* — Jason T Edwards
(74) *Attorney, Agent, or Firm* — Kilpatrick Townsend & Stockton LLP

(57) ABSTRACT

Methods and systems disclosed herein relate generally to systems and methods for analyzing various stroke properties determined from strokes inputted by a user to generate a new glyph set for rendering type characters. A font-generating application receives, via a stroke input on a typographic layer presented on a user interface, strokes that trace a visual appearance of a glyph set comprising one or more glyphs. The font-generating application determines stroke properties for the strokes. The font-generating application constructs a new glyph set from the stroke properties. The font-generating application applies the new glyph set to render, on a user interface, one or more type characters that match a visual appearance of the new glyph set.

17 Claims, 14 Drawing Sheets

FONT CUSTOMIZATION BASED ON STROKE PROPERTIES

TECHNICAL FIELD

This disclosure relates generally to methods that generate type characters that visually match brush strokes inputted on a user interface. More specifically, but not by way of limitation, this disclosure relates to analyzing various stroke properties determined from strokes inputted by a user to generate a new glyph set for rendering type characters.

BACKGROUND

Graphics-editing applications allow users to create digital illustrations using tools such as raster and vector brush effects. Examples of vector brush effects include creating tapered edges on each stroke, modifying angle of the brush, and modifying thickness of the brush stroke. However, the tools used to generate and customize graphical content in a digital illustration are not typically available for generating or customizing fonts that are applied to text elements included in the digital illustration. For instance, graphics-editing applications often define text elements using a particular font style with limited options for customization, such as changing the font's color or size, without providing vector brush effects used for modifying visual characteristics of text since. A user thus often struggles to customize text using a particular brushing and stroking style that might be applied to non-text elements in an illustration (e.g., backgrounds, objects, etc.). Conventional techniques for designing a new font typically require sketching almost all characters by hand then scanning the sketches which is cumbersome and inefficient. Even after creation, the new font may not become applicable in the event that the user modifies the illustration later, thus compounding the inefficiency. As a result, existing graphics-editing applications are unable to, for example, generate text elements in digital illustrations that stylistically match other illustrated portions of the digital illustrations.

BRIEF SUMMARY

Certain embodiments include a font-generating application that generates customized fonts. The font-generating application receives initial input, uses the initial input to determine stroke properties (e.g., font, brush, size). A new glyph set can be generated using the stroke properties, and the new text glyphs can be used by the user to type text data. In some instances, the font-generating application applies the stroke properties to various types of user input operations for a particular font. For example, if the font-generating application detects a change from a pixel brush input to a vector brush input, the font-generating application can recreate a complete stroke illustration of the text for the vector brush. In another example, if the font-generating application detects changes to visual properties of the text (e.g., text color), the font-generating application updates the stroke properties of the font data appropriately while maintaining the information originally captured in the initial glyph input. Further, the font-generating application can receive subsequent inputs, detect changes to the stroke properties reflected in the subsequent inputs, and applies the changed stroke properties to the new text glyphs. In effect, the updated glyphs can be used to further modify the font data.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
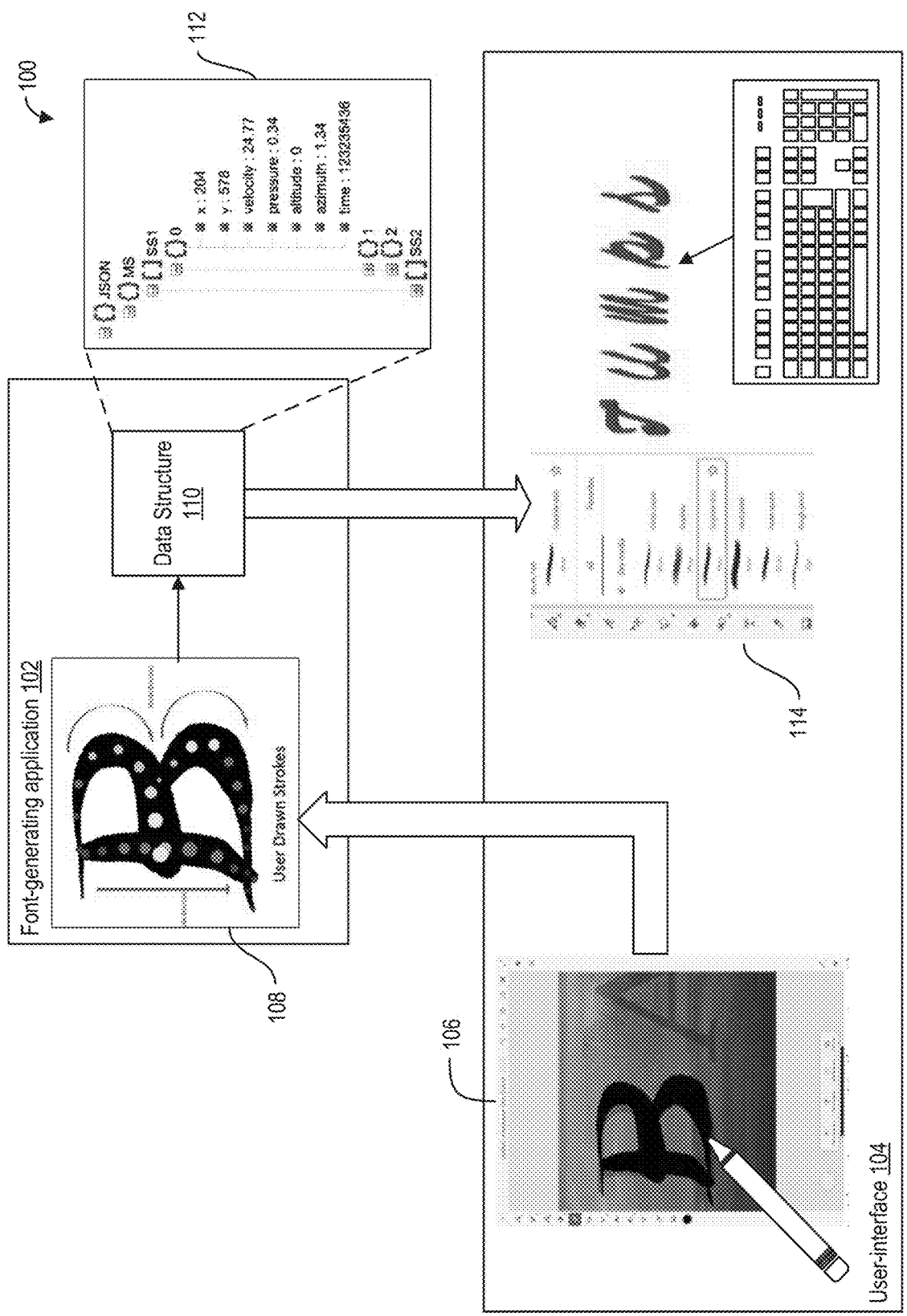
FIG. 1 illustrates computing environment for font customization based on stroke properties, according to some embodiments.

Certain embodiments described herein can address one or more of the problems identified above by generating new fonts or modifying existing fonts that match stroke styles drawn by a user. By analyzing few user strokes on a user interface, a font-generating application constructs an entire new glyph set that reflect the visual appearance of such strokes, and glyphs of the new glyph set are typed by the user as typed characters. The visual appearance of the typed characters thus stylistically match the styles drawn by the user.

In an illustrative example, a font-generating application receives a set of strokes that approximate a visual appearance of one or more glyphs. The strokes are received based on a stroke input on a typographic layer, in which the touch gesture (for example) trace the glyphs rendered on a text layer that is presented underneath the typographic layer. In this current example, a user interface displays a text layer that shows a letter "B" with reduced opacity and a typographic layer is overlaid on top of the text layer, in which the typographic layer appears invisible to the user. The user traces the letter "B" with his or her own brush style, color, and style, which are captured by the typographic layer of the user interface. In this instance, the strokes include three strokes: (1) a vertical stroke from on a left part of the letter "B"; (2) a first curved stroke that forms a right top part of the letter "B"; and (3) a second curved stroke that forms a right bottom part of the letter "B".

Continuing with this example, the font-generating application determines stroke properties for the respective strokes. The stroke properties include values identifying at least one of pressure, velocity, direction, or azimuth (e.g., a shape and/or angle of a curved path within the stroke) of the corresponding stroke. In some instances, a data structure (e.g., a JSON file) is generated to store the stroke properties. In the above example, the vertical stroke includes stroke properties including a vertical top-to-bottom direction. Depending on the pressure and velocity, the width of the stroke varies for the image depicting the letter "B". Each point of the vertical stroke is represented by a circle that identifies pressure and velocity values of the stroke point. In particular, a larger-sized circle indicates high pressure and low velocity, and a smaller-sized circle indicates low pressure and high velocity.

The font-generating application constructs a new glyph set by processing the stroke properties corresponding to each stroke. Each glyph of the new glyph set includes one or more subsections, including a horizontal-line subsection, a vertical-line subsection, a slant-line subsection, and a bowl-curve subsection. Each subsection of the glyph is generated to match the stroke properties, thereby allowing the new glyphs to match visual appearance of the stroke input. In the above example, a new glyph corresponding to letter "c" is generated based on stroke properties of the first or second curved stroke that forms a right part of the letter "B". In effect, the visual appearance of the new glyph "c" appears similar to the first or second curved stroke of "B", thereby matching the stroke style inputted by the user via the user interface.

Continuing with this example, the font-generating application applies the new glyph set to render one or more type characters on the user interface such that the type characters match a visual appearance of the new glyph set. In the above example, assume the new glyph set has a visual appearance of a sans-serif font having a green color. The user types "Quick Fox" on the user interface, in which the type characters corresponding to the phrase visually match the style of the new glyph set. Accordingly, the type characters match the stroke styles inputted by the user, thereby facilitating customization of new font styles.

Certain embodiments described herein provide improved software tools for modifying the appearance of text elements within a digital graphic. For instance, these embodiments use a set of particular rules or models to extract certain properties from user-provided drawing inputs (e.g., pressure, direction, etc.) and translate the extracted properties to a computer-implemented adjustment in a font object. In some cases, the application of these rules achieves an improved technological result, such as converting non-uniform or imprecise user drawing inputs into a digital format that can be applied to the programmatic definition of a font. The ease of font style customization addresses a challenge in conventional software tools, which are constrained to a limited set of modification options (e.g., change size or color of an existing font). Further, by extending stroke properties of few strokes to an entire set of glyphs, an efficient use of computer resources is realized over conventional techniques, which rely on constantly tracking user input that typically leads to consuming large amount of computer memory.

Definitions

"Glyph" refers to a specific shape, design, or representation of a character. Glyphs are building blocks of one or more typesets. A glyph can be a letter, numeral, or symbol having a specific design, and groups of glyphs together are called fonts.

"Font" refers to a specific style, weight, and width of a typeface. For example, a font includes Times Bold Extended. Times is a typeface family, Roman is a style, Bold is a weight, and Extended is a width.

"Type character" refers to a typographic element that conforms to the specification defined (e.g., style, weight, width) by a particular font and is entered via type-input devices such as a keyboard and/or a user-interface feature such as a virtual or touchscreen keyboard.

"Typeface" refers to a design for the letters, numbers, and symbols corresponding to a font. Typeface is often a part of a family of coordinated designs. For example, a typeface includes a serif font design such as "Times" or a sans-serif font design such as "Helvetica". Individual typefaces are usually identified by a family name (e.g., Times) and some additional terms indicating style, weight, and width.

"Stroke" refers to a point or path of pixels generated on a user interface when a stroke input is performed. For example, a vertical stroke input on the user interface causes a vertical stroke to be generated. One or more strokes generated by a user can collectively depict an illustration on a user interface, including an illustration the represents a font character. In some instances, a stroke includes a stroke property that includes values characterizing a visual appearance of the stroke. For example, the stroke property includes values corresponding to at least one of a width, a pressure, a velocity, a direction, or an azimuth of the stroke.

"Stroke input" refers to an action from a user detected by a computing device to generate one or more strokes. The stroke input includes touch input to a touch screen via an input implement such as a stylus or a finger. For example, stroke input includes a touch of a touch screen, scrolling of a mouse, gestures on a track pad, a touch on a touch screen drawing a line and/or figure, or a touch on a touch screen manipulating an option within a graphical user interface. Additionally, as used herein, the term "point of stroke input" refers to a unit of stroke input received at a specific time. For example, a movement of a finger or stylus across a touch screen can start with an initial point, have intermediate points, and finish with a termination point. Points of stroke input can be measured relative to the touch device that is receiving the stroke input.

Overall Environment for Font Customization Based on Stroke Properties

FIG. 1 illustrates an example of a computing environment 100 for font customization based on stroke properties, according to some embodiments. The computing environment 100 includes a font-generating application 102 and a user interface 104. In some instances, the font-generating application 102 and the user interface 104 reside in a same computer system, such as computing system 1000 of FIG. 10. Additionally or alternatively, the font-generating application 102 resides in a computer system different from that of the user interface 104, such that the two applications send and receive data via a communication network.

The user interface 104 initially receives a stroke input. The stroke input includes strokes 106 that trace a visual appearance of a glyph set comprising one or more glyphs (e.g., "B", "A"). For example, the strokes 106 are generated by the stroke input that traces over a "B" glyph that is displayed on the user-interface 104. In some instances, the glyph set is presented on a text layer of the user interface 104, in which the glyphs are depicted with reduced opacity. The stroke input is then applied to a separate layer, which is referred herein as a typographic layer. In this manner, the user interface 104 is able to accurately capture stroke input while facilitating the user to trace the glyphs shown on the user interface 104.

The font-generating application 104 receives the strokes 106 and generates stroke properties 108 corresponding to the strokes 106. In some instances, a stroke property for a stroke includes at least one of a pressure, a velocity, a direction, or an azimuth of the stroke. For example, the stroke properties 108 include: (1) a set of stroke pressures represented by size of circles depicted over the strokes 106; (2) velocity of the strokes represented by color shades (e.g., darker shade of the same color indicating higher velocity) of the circles; and (3) identification of each stroke of the strokes 106 represented by a color type of the circle (e.g., shades of brown color indicates a single stroke).

The font-generating application 102 generates a data structure 110 that includes the stroke properties 108. For example, the font-generating application 102 generates a JSON 112 that includes a pressure, a velocity, a direction, or an azimuth for each stroke of the strokes 106. In this example, the JSON 112 identifies, for a given stroke, a velocity value of 24.77, a pressure value of 0.34, an altitude value of 0, and an azimuth value of 1.34. In some instances, the font-generating application 102 allows modifications to the stroke properties 108 for further customization. Additionally or alternatively, the font-generating application 102 receives subsequent strokes (not shown) to either modify the existing stroke properties or replace the existing stroke properties with new stroke properties.

The font-generating application 102 uses the stroke properties 108 of the data structure 110 to generate a new glyph set 114. The user interface 104 shows the type characters "JUMPS" that reflect the stroke properties 108 identified by the font-generation application 102. In some instances, the new glyph set 114 is generated by applying the stroke properties 108 to an existing font, such that their respective font styles are merged together. The new glyph set 114 facilitates generation of type characters a user input different from the stroke input. For example, type characters of the new glyph set are generated on the user interface via a keyboard input.

Computing System for Font Customization Based on Stroke Properties

Figure 2:
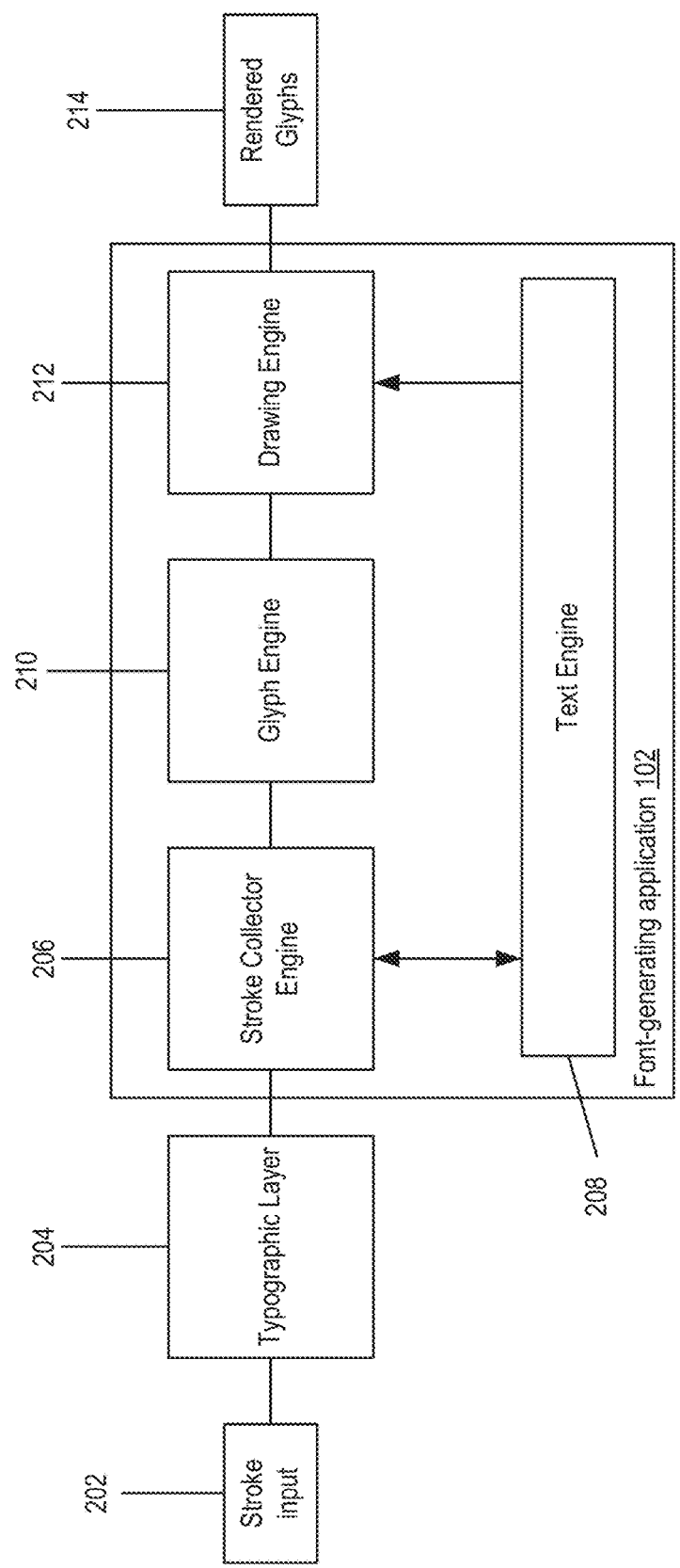
FIG. 2 depicts an example of a computing system for customizing fonts using stroke properties derived from a stroke input, according to some embodiments.

Referring now to the drawings, FIG. 2 depicts an example of a computing system 200 for customizing fonts using stroke properties derived from a stroke input 202, according to some embodiments. In some embodiments, a user provides the stroke input 202 into the computing system 200. The stroke input 202 includes a set of strokes or other, suitable type of input performed by the user on a user device such as a mobile computing device. In some examples, the strokes include normalized brush properties such as pressure, velocity, direction, and azimuth. In these examples, the user device is configured to detect the normalized brush properties from the stroke input 202. In some embodiments, the normalized brush properties of the stroke input 202 is received or otherwise determined by the computing system 200 via a typographic layer 204. The typographic layer 204 receives the stroke input 202 and, based on the stroke input 202, determines the pressure, the velocity, the direction, and the azimuth of strokes performed by the user in generating the stroke input 202. To determine the pressure from the stroke input 202, the typographic layer 204 receives pressure values collected by a pressure sensitive capacitor of a input device (e.g., a stylus pen). In some instances, a different type of an input device (e.g., a touchscreen device) includes a plurality of capacitive sensors that collect the pressure values of the stroke input 202. To determine the velocity from the stroke input 202, the typographic layer 204 collects respective time values of an initial point and a termination point detected by the capacitive sensors of the input device (e.g., a graphic tablet), and calculates the velocity derived from a difference between the respective time values. To determine the direction from the stroke input 202, the typographic layer 204 identifies respective coordinate values of an initial point and a termination point of the stroke input 202, and determines a direction by identifying a Euclidean vector value between the respective coordinate values. To determine the azimuth from the stroke input 202, the typographic layer 204 identifies an angle formed within a path formed by the stroke input 202.

A font-generating application (e.g., the font-generating application 102 of FIG. 1) includes a stroke collector engine 206, a text engine 208, a glyph engine 210, and a drawing engine 212. The typographic layer 204, in some examples, is communicatively coupled to the stroke collector engine 206, and the typographic layer 204 transmits the stroke input 202 that includes the normalized brush properties to the stroke collector engine 206. In some embodiments, the stroke collector engine 206 is additionally communicatively coupled to the text engine 208 that is configured to generate stroke properties. The text engine 208 generates a data structure, such as a JSON file or other suitable file type, that includes the stroke properties. The stroke collector engine 206, in some examples, determines a set of strokes based on the received brush properties of the stroke input 202. For example, the stroke collector engine 206 determines each stroke of the set of strokes by identifying an initial point and a terminal point of each touchscreen gesture on the input device. In some instances, a subset of the set of strokes collectively represent a glyph, in which the glyph is one of a letter of an alphabet, a number, or a special character. The stroke collector engine 206, in some examples, based on the determined set of strokes, determines a base glyph that is traced by the stroke input 202 and transmits the base glyph to the text engine 208 for determining stroke data and properties based on the base glyph and the set of strokes. As used herein, the base glyph refers to a glyph presented on the text layer of the user interface, which allows the user to generate the stroke input 202 by tracing the presented glyph.

The stroke collector engine 206, in some embodiments, is communicatively coupled to the glyph engine 210. The glyph engine 210 receives the stroke data (e.g., the strokes, the base glyph) from the stroke collector engine 206 for determining a skeleton of the base glyph and a flow of the strokes. In some examples, the glyph engine 210 determines the skeleton of the base glyph by deforming the strokes of the base glyph to a set of axes of a localized parametric coordinate system. The glyph engine 210 additionally or alternatively performs a thinning algorithm for determining relevant stroke points of the stroke input 202. The glyph engine 210, in some embodiments, uses the relevant stroke points to determine the flow of the strokes by defining a relationship between the strokes, which includes an order of the strokes. To define the relationship of the strokes, the glyph engine 210 performs operations on the strokes including: determining nearest neighbors, defining paths between the nearest neighbors, optimizing the defined paths using a cost-reduction function, and breaking the optimized paths to produce smooth curves for the strokes, and the like.

In some examples, the glyph engine 210 uses the skeleton of the base glyph and the flow of the strokes to generate to a new glyph that matches the visual appearance of the stroke input 202. The glyph engine 210 generates a new glyph set, that includes one or more new glyphs, and transmits the new glyph set to the drawing engine 212 that is communicatively coupled to the glyph engine 210. In some instances, the new glyph set is stored as a glyph file, which is a data structure (e.g., a JSON file) that specifies a stroke property for a stroke forming a part of a new glyph. For example, the data structure specifies a width value, a velocity value, and a pressure value of a slant stroke for the uppercase character "A". In some examples, the drawing engine 212 parses the glyph file to render the new glyphs as type characters. The drawing engine 212 is additionally communicatively coupled to the text engine 208 for receiving text properties and transformation information for rendering the type characters.

Process for Font Customization Based on Stroke Properties

Figure 3:
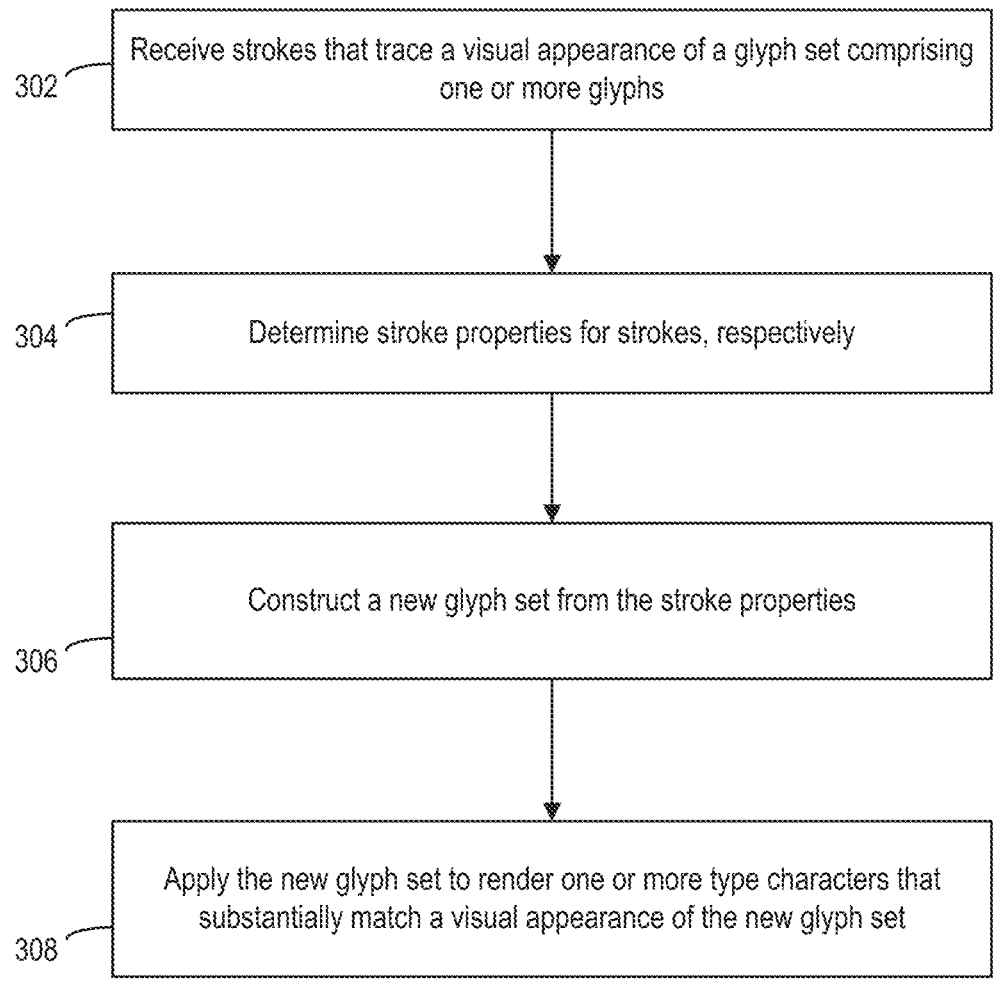
FIG. 3 illustrates a process for font customization based on stroke properties, according to some embodiments.

FIG. 3 illustrates a process 300 for font customization based on stroke properties, according to some embodiments. For illustrative purposes, the process 300 is described with reference to the components illustrated in FIG. 1, though other implementations are possible. For example, the program code for a font-generating application 102 of FIG. 1, which is stored in a non-transitory computer-readable medium, is executed by one or more processing devices to cause a server system to perform one or more operations described herein.

At step 302, the font-generating application receives strokes that trace a visual appearance of a glyph set comprising one or more glyphs. The font-generating application receives the strokes via stroke input on a typographic layer presented on a user interface (e.g., the user interface 104 of FIG. 1). In some instances, the glyph set is presented on a text layer of the user interface 104, in which the glyphs are depicted with reduced opacity.

At step 304, the font-generating application determines stroke properties for strokes, respectively. A stroke property for a stroke includes at least one of a pressure, a velocity, a direction, or an azimuth of the stroke. For example, the stroke property for a stroke includes a velocity value of 24.77, a pressure value of 0.34, an altitude value of 0, and an azimuth value of 1.34. In some instances, the stroke properties are stored in a data structure, such as the JSON 112 of FIG. 1. In some instances, the stroke properties are determined based on a pixel position identified from a stroke flow of the stroke input relative to a pixel position of the glyph shown on the text layer of the user interface 104.

At step 306, the font-generating application constructs a new glyph set from the stroke properties. To generate the new glyph set, the font-generating application: (1) generates a deformed coordinate system defined by a path of the strokes and a width of the strokes; (2) determines, for each new glyph of the new glyph set, a skeletal structure for the new glyph based on positions of the strokes relative to the deformed coordinate system; and (3) applies a thinning algorithm to each stroke of the strokes to identify stroke points corresponding to the skeletal structure. In some instances, the font-generating application constructs glyphs of the new glyph set by determining a stroke flow for each new glyph of the set of glyphs by identifying a smallest cost path for connecting the stroke points of the skeletal structure.

At step 308, the font-generating application applies the new glyph set to render, on the user interface, type characters that match a visual appearance of the new glyph set. In some instances, the type characters conform to the specification defined (e.g., style, weight, width) by the new glyph set. The type characters can be typed into the user interface 104 by using I/O devices such as a keyboard. Process 300 terminates thereafter.

Components for Font Customization Based on Stroke Properties

Figure 4:
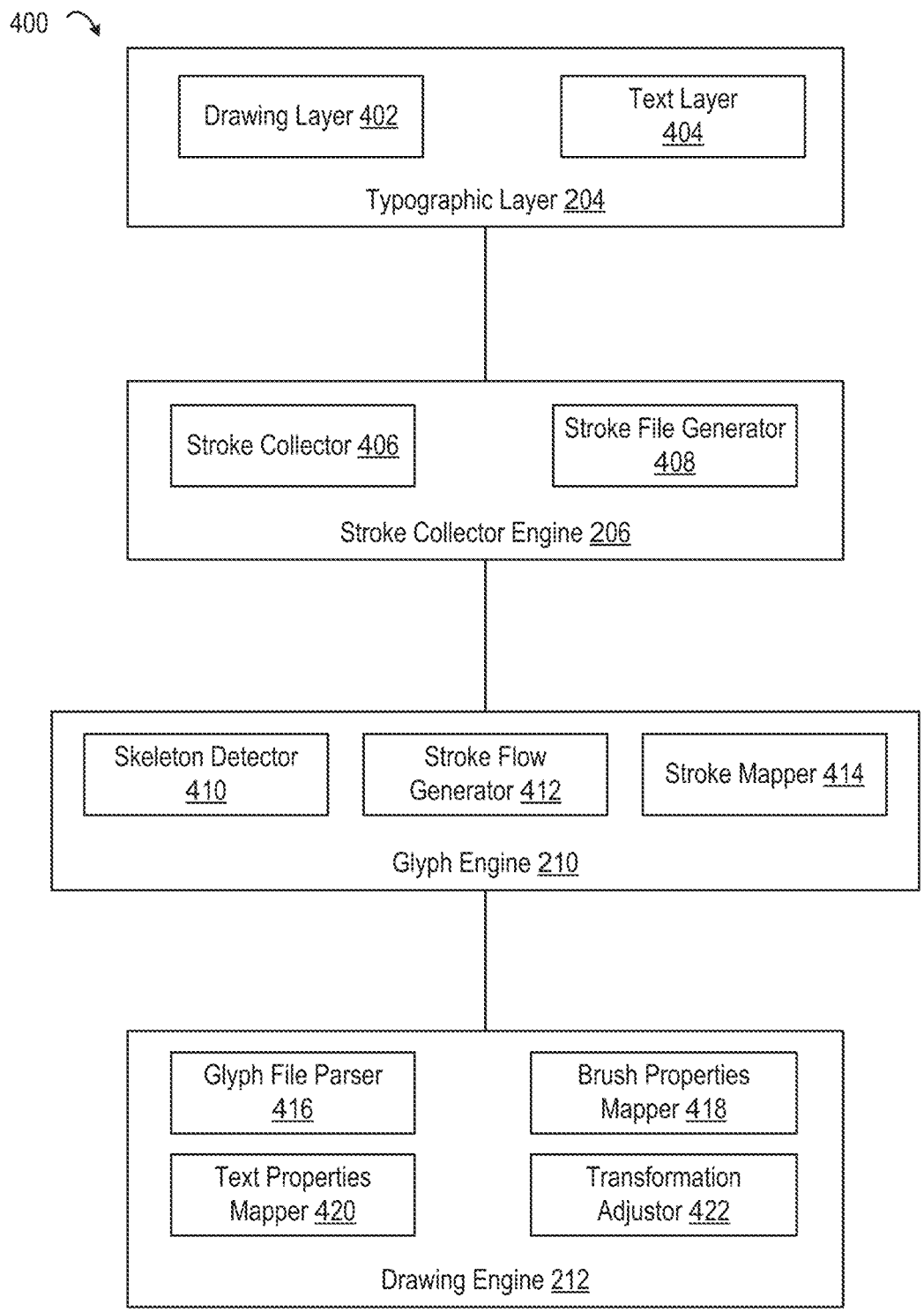
FIG. 4 depicts an example of application components font customization based on stroke properties, according to some embodiments.

FIG. 4 depicts an example of application components 400 for font customization based on stroke properties, according to some embodiments. The components 400 include, as described with respect to FIG. 2, the typographic layer 204, the stroke collection layer 206, the glyph engine 210, and the drawing engine 212. In some embodiments, the typographic layer 204 includes a drawing layer 402 and a text layer 404. The typographic layer 204 is configured to receive the stroke input 202 from user devices such as a mobile computing device. In combination, the drawing layer 402 and the text layer 404 allow the user to generate indications of at least one new glyph. In some embodiments, the drawing layer 402 allows the user to draw, using the user device, strokes that combine to form the new glyph. The text layer 404, in these embodiments, provides base glyphs over which the user generates the strokes. For example, if the user desires to generate an "A" with a certain, non-existing font as the new glyph, the text layer 404 provides an existing "A" and the user generates the new glyph via the drawing layer 402. In response to receiving the input, in some examples, the drawing layer 402 determines and is configured to normalize brush properties based on the input. For instance, the drawing layer 402 receives the stroke input 202 and determines the pressure, the velocity, the direction, and the azimuth of the stroke input 202. The typographic layer 204 transmits the stroke input 202 including the normalized brush properties to the stroke collector engine 206.

(a) Identifying Stroke Properties

The stroke collector engine 206, in some embodiments, includes a stroke collector 406 and a stroke file generator 408. The stroke collector engine 206 receives the stroke input 202 that includes the normalized brush properties from the typographic layer 204. The stroke collector 406 uses the normalized brush properties to determine a set of strokes that are included in the stroke input 202. The stroke collector 406, in some examples, is communicatively coupled to the stroke file generator 408. The stroke collector 406 transmits the strokes to the stroke file generator 408 for generating a file relating to the strokes. In some examples, the combination of the stroke collector 406 and the stroke file generator 408 determines a base glyph that is indicated by the stroke input 202. In response to determining the base glyph, the stroke collector engine 206 is configured to transmit the base glyph to a text engine, such as the text engine 208, for generating a file that includes data and properties of the base glyph. In some embodiments, the stroke file generator 408 uses the file from the text engine to generate a stroke file for subsequent use, and in other embodiments, the stroke file generator 408 augments the file from the text engine with information relating to the strokes to generate the stroke file. In some examples, the stroke file is a JSON file or other suitable file for storing and transmitting information relating to the strokes. The stroke collector engine 206 is configured to, upon generating the stroke file, transmit the stroke file to the glyph engine 210.

(b) Determining Stroke Points and Paths for the New Glyph Set

The glyph engine 210, in some examples, includes a skeleton detector 410, a stroke flow generator 412, and a stroke mapper 414. The glyph engine 210 is configured to receive the stroke file from the stroke collector engine 206, and the stroke file, in some embodiments, is used to perform various operations. For example, the skeleton detector 410 uses the stroke file to detect a skeleton of the new glyph to be represented by the strokes. In some embodiments, the skeleton detector 410 detects the skeleton using a parametric coordinate system transformation along the direction of the strokes. A reference backbone and thickness of the strokes are additionally or alternatively used for detecting the skeleton. The skeleton detector 410 is additionally configured to perform a thinning algorithm on the strokes within the stroke file to determine relevant, or valid, strokes. In some embodiments, strokes within the stroke file that are not determined to be relevant or valid are discarded or otherwise ignored.

Figure 5:
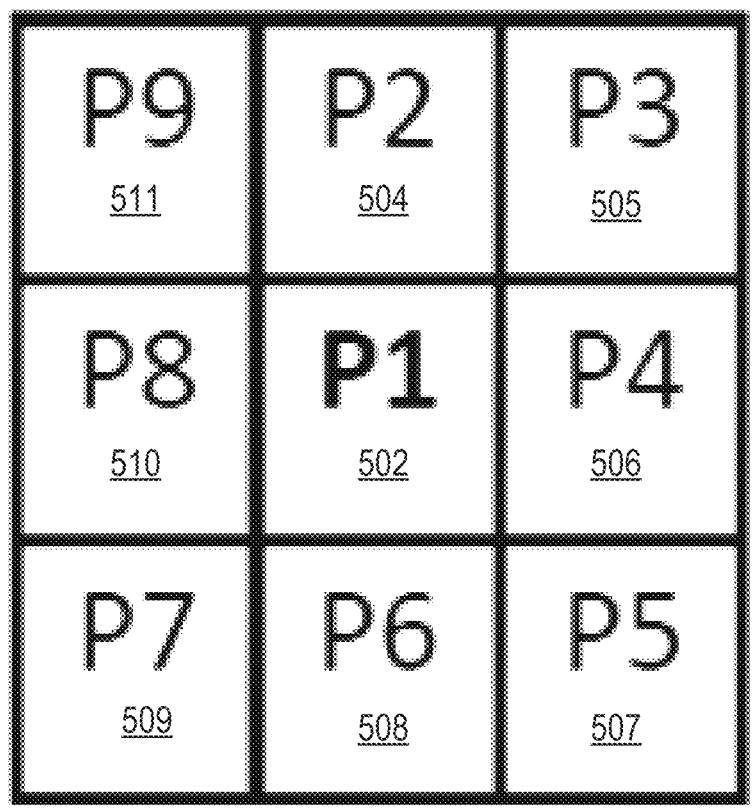
FIG. 5 depicts an example of a pixel diagram used by a thinning algorithm, according to some embodiments.

FIG. 5 depicts an example of a pixel diagram 500 used by a thinning algorithm, according to some embodiments. In some embodiments, the thinning algorithm operates on a gray-scale image of the stroke file. The thinning algorithm identifies black pixels and assigns the black pixels a value of 1, other pixels are assigned a 0 value, and each black pixel includes up to eight nearest-neighbors. For example, an identified pixel 502 of the stroke file may be mapped on a pixel plot 500. The pixel plot includes the identified pixel 502 and a set of nearest-neighbor pixels 504-511. In some examples, the thinning algorithm is applied using two steps. In a first step, each pixel with assigned value 1 that is included in the stroke file that includes the nearest-neighbor pixels 504-511, that includes between two to six pixels 504-511 having assigned value of 1, that includes one transition from 0 value to 1 value between the pixels 504-511, and that includes a value of zero for the pixel 504, 506, or 508 and for the pixel 506, 508, or 510 is assigned a value of zero. In a second step, each pixel with assigned value 1 that is included in the stroke file that includes the nearest-neighbor pixels 504-511, that includes between two to six pixels 504-511 having assigned value of 1, that includes one transition from 0 value to 1 value between the pixels 504-511, and that includes a value of zero for the pixel 504, 506, or 510 and for the pixel 504, 508, or 510 is assigned a value of zero. The first step and the second step are iterated until no changes are made to pixels included in the stroke file. Pixels with assigned value 1 included in the stroke file subsequent to the thinning algorithm being applied to the stroke file are considered valid or otherwise relevant stroke points.

Referring back to FIG. 4, the stroke flow generator 412 is configured, in response to the skeleton detector 410 detecting the skeleton and the relevant strokes, to perform operations for determining a flow of the relevant strokes. In some examples, determining the flow of the relevant strokes involves determining a relationship, or an order, between the relevant strokes. The stroke flow generator 412 is configured to generate a nearest-neighbors graph in which the stroke flow generator 412 generates a matrix that indicates a Euclidean distance between points of the relevant strokes. In some embodiments, the stroke flow generator 412 rearranges the relevant strokes into a [N, 2] array and generates the nearest-neighbor graph for connecting each relevant stroke to at least two nearest neighbors. The stroke flow generator 412 generates a sparse matrix of size (N×N) in which rows of the sparse matrix represent the relevant strokes and columns represent Euclidean distance to the corresponding relevant strokes. In some examples, the stroke flow generator 412 uses the matrix to define paths between the points of the relevant strokes. The defined paths can include crossed paths or otherwise nonsensical paths that are not useful in determining the new glyph. In some embodiments, the stroke flow generator 412 extracts the defined paths using a preordering search from a start relevant stroke. Based on the preordering search, the stroke flow generator 412 generates various paths through the relevant strokes. Since a correct starting point is not defined, the various paths include crossing paths, and, the various paths are not yet broken into more than one stroke.

In some embodiments, the stroke flow generator optimizes the defined paths using a cost-reduction function. The cost-reduction function minimizes distances for the defined paths, which eliminates crossed, or otherwise not useful, paths. In some examples, the stroke flow generator 412 orders points of a potentially optimized path and calculates cost using the Euclidean distance between pairs of points included in the potentially optimized path. The stroke flow generator 412 calculates a slope of cost for various points included in the optimized path, and the stroke flow generator 412 verifies that the potentially optimized path includes a minimum cost. In some examples, the stroke flow generator 412 uses the following cost function:

$$\text{cost} = \Sigma(\text{list}[i] - \text{list}[i-1])^2$$

in which list indicates a list of relevant stroke points on the potentially optimized path. The stroke flow generator 412, in some examples, breaks the optimized paths for determining a correct flow for the strokes. The optimized paths, in some examples, represent the new glyph or new glyphs with a single stroke, but some glyphs are represented by more than one stroke. The stroke flow generator 412 breaks the minimized paths by applying a maximum cost to the minimized paths such that minimized paths with costs greater than the maximum cost will be broken into more than one minimized path. In some embodiments, the stroke flow generator 412 applies the maximum cost to each pair of minimized paths, and, for each pair of minimized paths that includes a cost greater than that of the maximum cost, the stroke flow generator 412 generates more than one stroke for the pair of minimized paths. The stroke flow generator 412 may use the following inequality to apply the maximum cost to each pair of minimized paths to generate broken paths:

$$C_{CostBetweenTwoPaths} > C_{Max}$$

in which C indicates a cost. The broken paths indicate the glyphs, and the stroke flow generator 412 is configured to transmit information or data relating to the broken paths to the stroke mapper 414.

Figure 6:
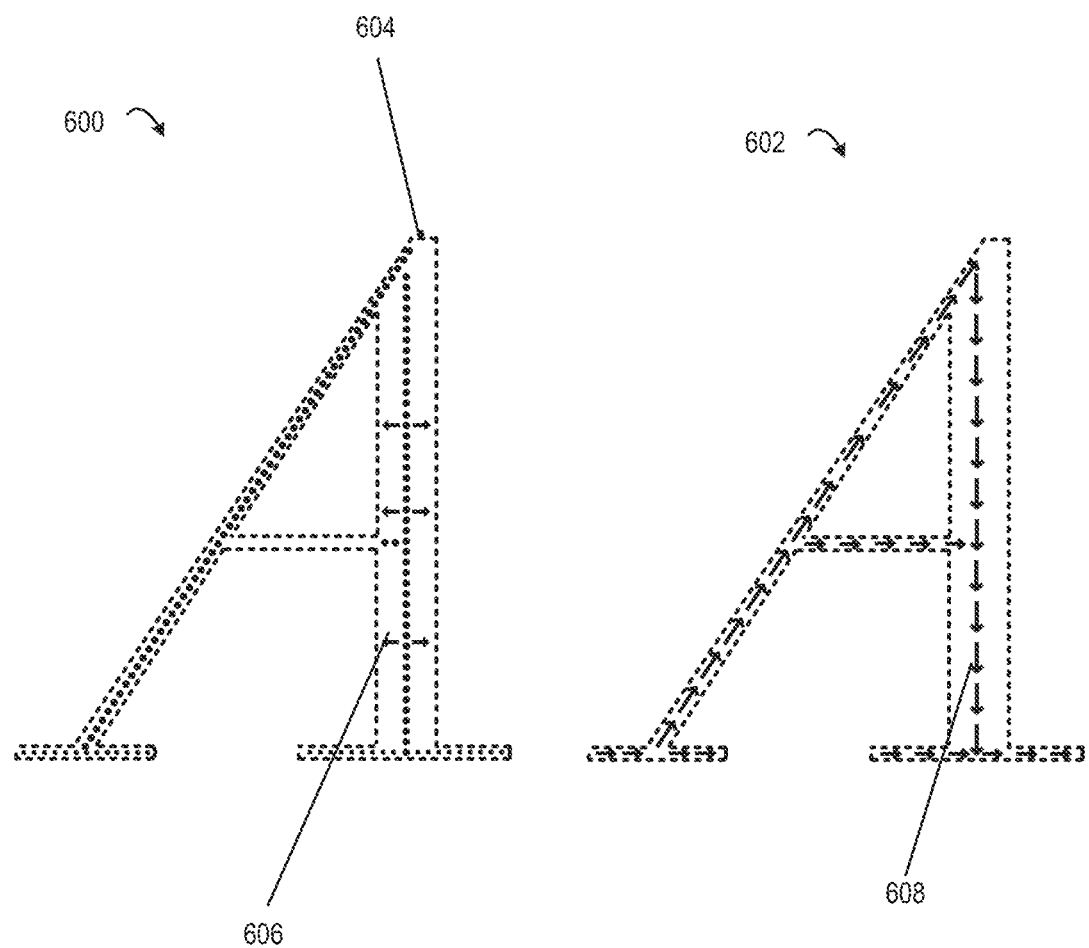
FIG. 6 depicts an example of a skeleton of a glyph and a stroke flow of a glyph, according to some embodiments.

FIG. 6 depicts an example of a skeleton 600 of a glyph and a stroke flow 602 of a glyph, according to some embodiments. As illustrated, the skeleton 600 and the stroke flow 602 are indicative of the alphabetical character "A." Other alphabetical characters, numbers, special characters, and the like are usable in place of the alphabetical character "A." The skeleton 600 includes a base glyph 604 and a width 606 of a received stroke. The skeleton 600, in embodiments, includes additional or alternative components. The base glyph 604 represents the alphabetical character of the glyph without brush properties. The width 606 represents a distance of the center of the received stroke to an outer edge of the received stroke. The base glyph 604 and the width 606 are usable to determine parametric coordinates for transforming the received stroke.

The stroke flow 602 includes a set of strokes indicating a flow of the strokes for generating the glyph. The stroke flow 602 includes suitable numbers of received strokes for generating the glyph. Each stroke included in the strokes of the stroke flow 602 include a directional indicator 608 that conveys a direction of each stroke. In some embodiments, a computing device, such as the computing system 200 that includes components 400, uses the skeleton, in combination with stroke input, to determine the stroke flow 602. And, the combination of the skeleton 600 and the stroke flow 602 are usable to determine an new glyph for subsequent rendering.

(c) Mapping the Stroke Properties to Generate the New Glyph Set

The stroke mapper 414 is configured to receive the information relating to the broken paths from the stroke flow generator 412. In some embodiments, the stroke mapper 414 uses the broken paths from the stroke flow generator 412 to map user intentions to determine the new glyph. The stroke mapper 414 maps each broken path of the broken paths to a stroke that is a subset of the new glyph. The strokes that combine to form the new glyph are saved or otherwise stored by the stroke mapper 414 as a glyph file in which the glyph file includes information for rendering the new glyph and is a JSON file or other suitable file for storing information relating to the new glyph. The glyph engine 110, in some embodiments, is configured to transmit the glyph file to the drawing engine 112 at least for rendering the new glyph.

In some embodiments, the stroke mapper 414 maps user intentions over glyphs by following a mapping algorithm. The algorithm creates an empty drawing layer over a valid text object layer in which contents of the valid text object layer are centered and the opacity of the contents are reduced for allow the user to trace over the contents. The user chooses from various combinations of brush properties, color, sizes, etc., for drawing the new glyph.

Figure 7:
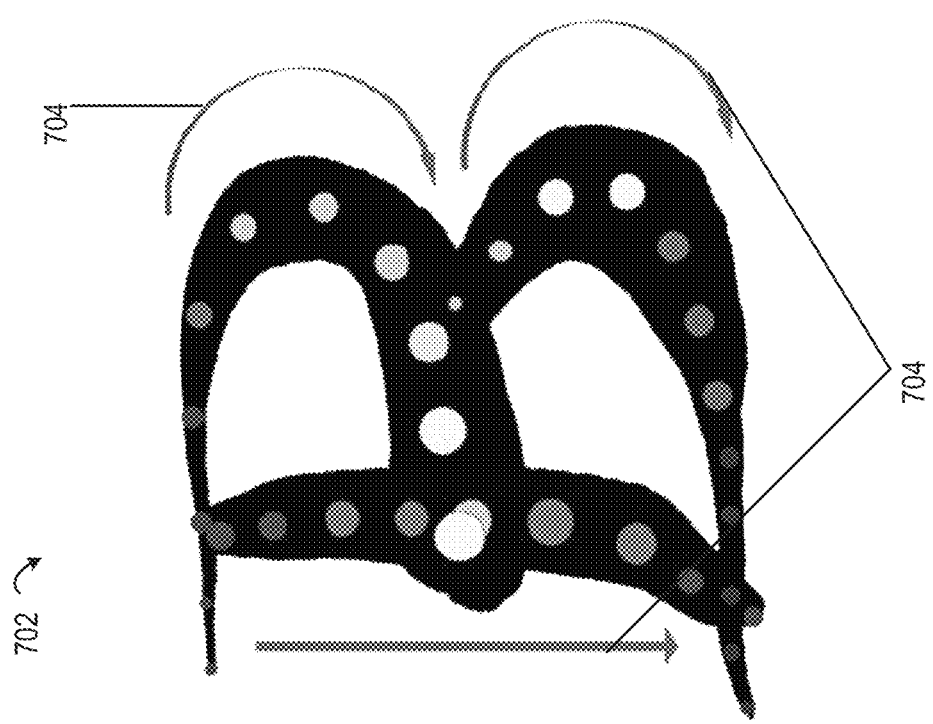
FIG. 7 depicts an example of user input generated over a skeleton of a glyph, according to some embodiments.
Figure 7:
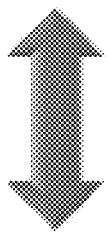
Figure 7:
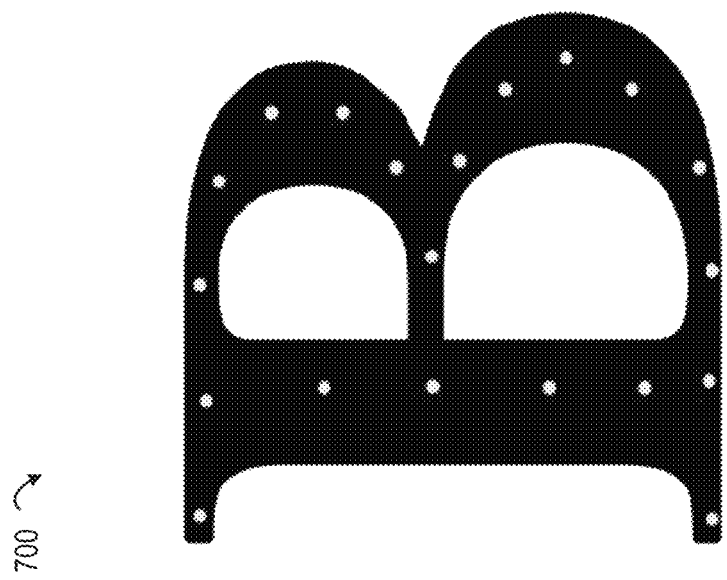

FIG. 7 depicts an example of user input generated over a skeleton of a glyph, according to some embodiments. In this example, the user draws or otherwise provides input indicating the new glyph. In some examples, the contents include the skeleton 700 of the glyph, and the user provides input 702 in the form of strokes that the stroke mapper 414 captures and maps a direction 704 of user-input strokes using the skeleton 700 of the glyph. The stroke mapper 414 transforms, sizes, and positions user input over the skeleton 700 of the glyph, and the stroke mapper 414 stores raw data associated with stroke and brush style of the user input. The stroke mapper 414 transforms the user input into a text layer coordinate system and matches the user input to underlying glyphs to approximate the new glyph. The stroke mapper 414 maximizes overlaps for selecting the new glyph. For example, the input 702 indicates an alphabetical "B" and the user generated the "B" using three strokes indicated by the directions 704. The stroke mapper 414 selects "B" using the aforementioned method and stores as stroke-data data relating to the input 702. The stroke mapper 414 separates the new glyph into sub-skeletons, or stroke-types, such as a horizontal line, a vertical line, a slant line, a bowl curve, or other suitable stroke-types.

The stroke mapper 414 propagates a desired style, determined from the stored data, by breaking down each glyph in a certain font, or in the text object layer, into sub-sections that include brush properties determined similarly to that of the input 702. If a sub-section is missing, the stroke mapper 414 applies average values in place of the missing sub-section. The stroke mapper 414 processes, and stores data for, end points separately. In some examples, the stroke mapper 414, the stroke flow generator 412, or a combination thereof stores stroke information, brush properties, user input, a combination thereof, or other suitable information via a JSON file that is transferrable between the components 400.

Figure 8:
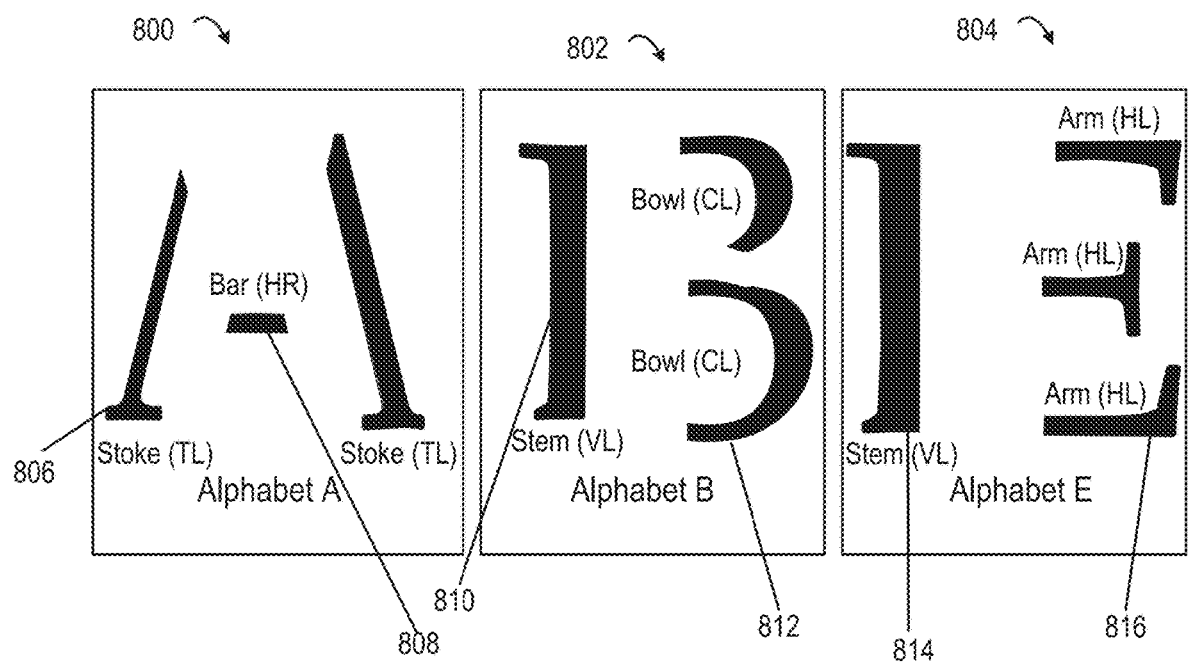
FIG. 8 depicts an example of determined glyph anatomy types, according to some embodiments.

FIG. 8 depicts an example of determined glyph anatomy types, according to some embodiments. The example includes stroke types that combine to form a first glyph 800, a second glyph 802, and a third glyph 803. As illustrated, the first glyph 800 is an alphabetical "A," the second glyph 802 is an alphabetical "B," and the third glyph 804 is an alphabetical "E." Other alphabetical characters, numbers, special characters, and the like are usable in place of the glyphs 800, 802, and 804. Each of the glyphs 800, 802, and 804 includes a one or more types of glyph anatomy. For example, the first glyph 800 includes a stoke 806 and a bar 808, the second glyph 802 includes a stem 810 and a bowl 812, and the third glyph 804 includes a stem 814 and an arm 816. The stoke 806, the bar 808, the stem 810, the bowl 812, and the arm 816 are determined by the stroke collector engine 206, the glyph engine 210, a combination thereof, or other suitable method, based on the plurality of strokes corresponding to the user input. The types of strokes are used to determine the new glyph, to render the new glyph, or a combination thereof.

Referring again to FIG. 4, the drawing engine 212, in some embodiments, includes a glyph file parser 416, a brush properties mapper 418, a text properties mapper 420, and a transformation adjustor 422. The drawing engine 212 is configured to receive the glyph file from the glyph engine 210. In some examples, the glyph file parser 416 is a format converter and receives the glyph file for parsing the glyph file and for determining properties relating to the new glyph based on the glyph file. Based on the parsing, the glyph file parser 416 determines parsed information that includes brush properties associated with the new glyph such as pressure, velocity, direction, and azimuth, the skeleton of the new glyph, and the flow of the strokes that combine to form the new glyph. In some embodiments, the glyph file parser 416 transmits or otherwise shares the parsed information with the brush properties mapper 418, the text properties mapper 420, and the transformation adjustor 422.

The brush properties mapper 418 receives the parsed information for mapping the brush properties. In some embodiments, the brush properties mapper 418 maps the brush properties from the user input 202, or from the parsed information, to the new glyph. For instance, the brush properties mapper 418 applies the brush properties, that include the pressure, the velocity, the direction, and the azimuth, of the user input 202 to the new glyph. The text properties mapper 420, in some examples, uses the parsed information, such as the skeleton and the flow of the strokes, to map text properties, such as location, width, etc., of the new glyph. Additionally, the text properties mapper 420 uses fetched coordinate data to map the text properties of the new glyph. In some embodiments, the brush properties mapper 418, the text properties mapper 420, or a combination thereof, or other suitable components of the drawing engine 212, communicates with the text engine for generating files relating to text properties, mapping, transformations, etc.

(d) Rendering the Mapped Stroke Data

The transformation adjustor 422 is configured to receive or otherwise access the parsed information for transforming data for, or otherwise rendering, the new glyph. For example, the text properties mapper 420 determines a location of the new glyph, and, in response to the text properties mapper 420 determining the location, the transformation adjustor 422 transforms pre-processed strokes from the user input 202 for rendering the new glyph at the determined location. In some examples, the transformation adjustor 422 queries a bounding box and a center position for the new glyph for rendering the new glyph. In some instances, the drawing engine 212, or other suitable applicant components 400, saves the new glyph as a font file. The font file, in some embodiments, is used for automatically regenerating the new glyph and is transferrable among various user devices and platforms.

Editing Properties of New Glyph Set

Once the new glyph is rendered, the font-generating application 102 distributes properties of the rendered new glyph among other glyphs within the font of the new glyph and among other selected glyphs among the user input 202. In some instances, the font-generating application 102 facilitates editing of the new glyph set for properties such as color, shape, and other suitable brush or text properties, for regional changes that edit a subset of the rendered glyph, and for typeface anatomy editing that changes graphical elements of the rendered glyph, subsequent to rendering the new glyph.

(a) Region-Based Editing of the New Glyph Set

Figure 9:
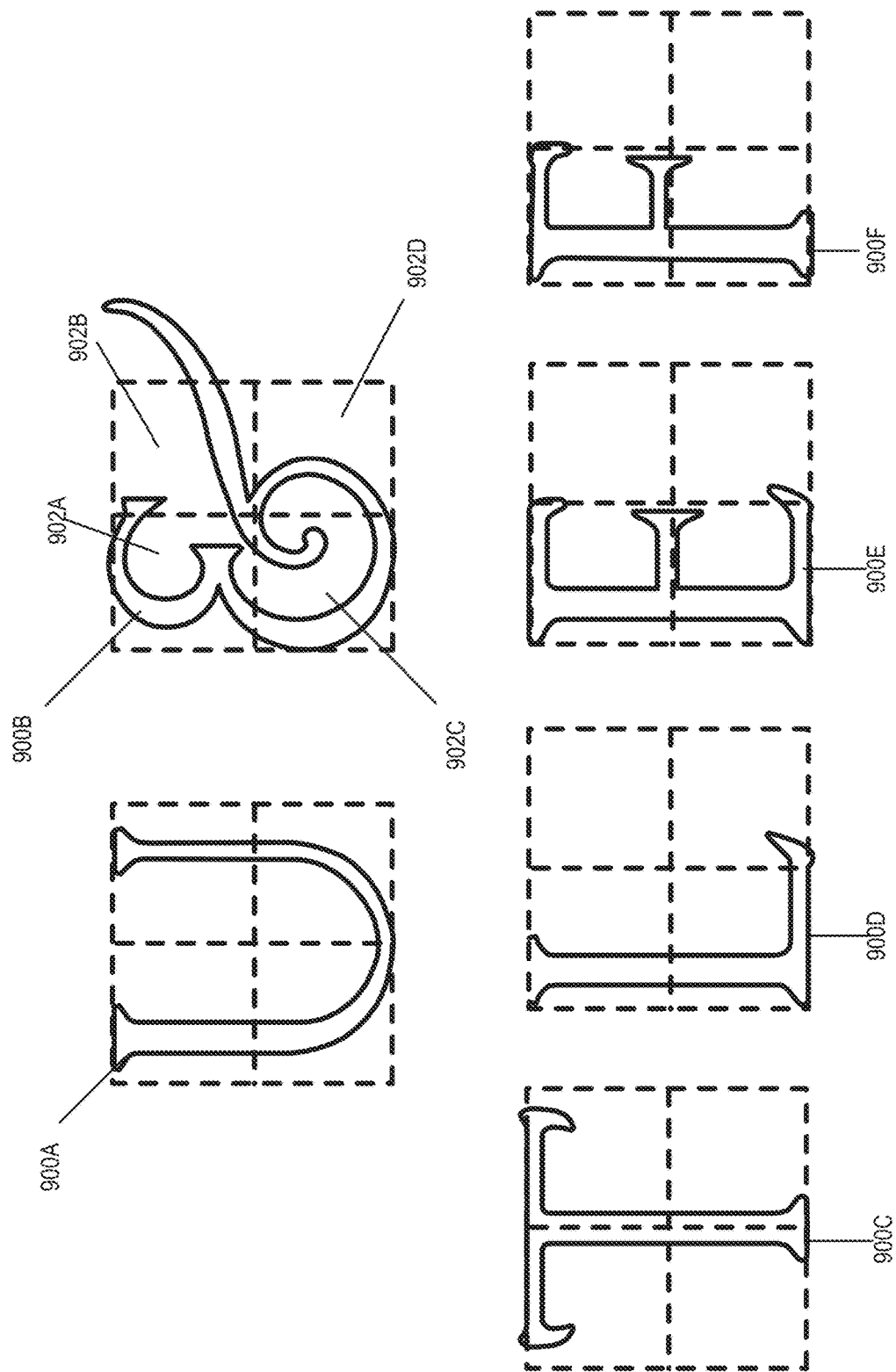
FIG. 9 depicts an example of various grids that include grid-cells that include glyph anatomies, according to some embodiments.

FIG. 9 depicts an example of various grids 900a-f that include glyph anatomies used for region-based editing of the new glyph set, according to some embodiments. Each grid 900, as illustrated, includes four grid-cells 902a-d that include indications of a certain glyph. Points on the skeleton 500 of the glyph are stored in the grid-cells 902. In some embodiments, the font-generating application 102 performs the region-based edits the following steps. The font-generating application 102 records stroke-points of a user input (e.g., the user input 202 of FIG. 2) as edit data for applying to a different glyph, the stroke-points having brush properties. The font-generating application 102 calculates a glyph over which the user was performing the region-based edits by identifying stroke-point locations of the edit data. The font-generating application 102 identifies a nearest glyph to the stroke-point locations and identifies the grid-cell 902 that includes the edit data. The font-generating application 102 determines a relative position, via a vertical distance and a horizontal distance, of the edit data in the grid-cell 902. The font-generating application 102 computes the skeleton points included in the grid-cell 902, and the font-generating application 102 determines the skeleton points that are nearest to the relative position. The font-generating application 102 stores edit stroke points that are within a threshold circular area and computes a first mean of the edit stroke points within the threshold circular area. The font-generating application 102 determines and computes a second mean of edit stroke points in other grid-cells 902 that include the same or similar horizontal distance. The font-generating application 102 uses the stored edit stroke data, the first mean, and the second mean to render the same strokes starting at different positions of the glyph. The font-generating application 102 repeats the aforementioned steps for each subsequent glyph.

(b) Typeface Based Editing of the New Glyph Set

Figure 10:
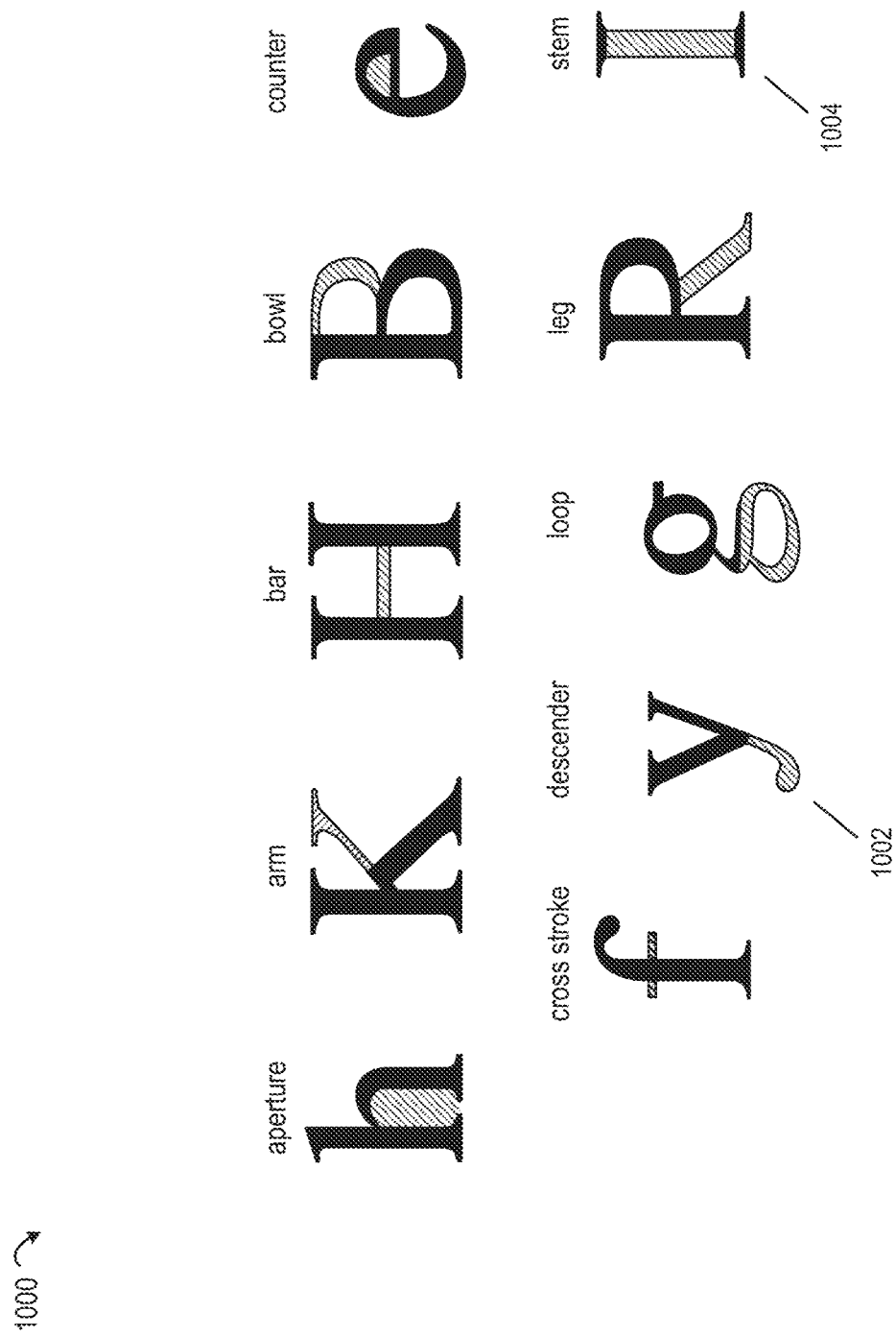
FIG. 10 depicts an example set of typeface anatomy used for editing the new glyph set, according to some embodiments.

In some instances, the font-generating application 102 facilitates editing of the new glyph set using a typeface anatomy identified for each glyph of the new glyph set. FIG. 10 depicts an example set of typeface anatomy used for editing the new glyph set, according to some embodiments. As used herein, the typeface anatomy identifies one or more graphical elements that form a particular glyph.

In some instances, the font-generating application 102 performs a heuristic based anatomy detection by separating the strokes of a new glyph to different parts of the anatomy. The font-generating application 102 uses a different strategy is for every anatomy section which involves, various typographic properties. For example, the font-generation application 102 identifies a descender anatomy 1002 by calculating the baseline for glyph and then any stroke below this height with a single end point connected to the glyph strokes. In effect, the font-generating application 102 identifies the descender anatomy 1002 for glyphs corresponding to 4 lowercase alphabets "j", "p", "q", and "y". In another example, the font-generating application 102 identifies a stem anatomy 1002 by determining a largest straight line amongst the stroke points with a tolerance of +/−2% error amongst any stroke point slope to contribute to the straight line. In particular, the font-generating application 102 recognizes that a straight line may not be a line parallel to y-axis, thereby calculating the slope in the largest straight line. In yet another example, the font-generating application 102 identifies an ascender anatomy (not shown) by calculating a cap height for glyph and determining that any stroke point above the cap height with a single end point connected to the glyph stroke as the ascender anatomy.

In some embodiments, the font-generating application 102 receives one or more strokes and applies the strokes to edit the identified typeface anatomy. The font-generating application 102 receives the strokes based on embodiments shown in FIG. 2. The font-generating application 102 then selects a typeface anatomy of the new glyph for which the strokes are to be applied. In some instances, the font-generating application 102 selects the typeface anatomy by determining that the selected typeface anatomy has the shortest Euclidean distance to the strokes. Once identified, the font-generating application 102 applies the strokes to edit the selected typeface anatomy of the new glyph.

Example of Rendering and Editing the New Glyph Set

Figure 11:
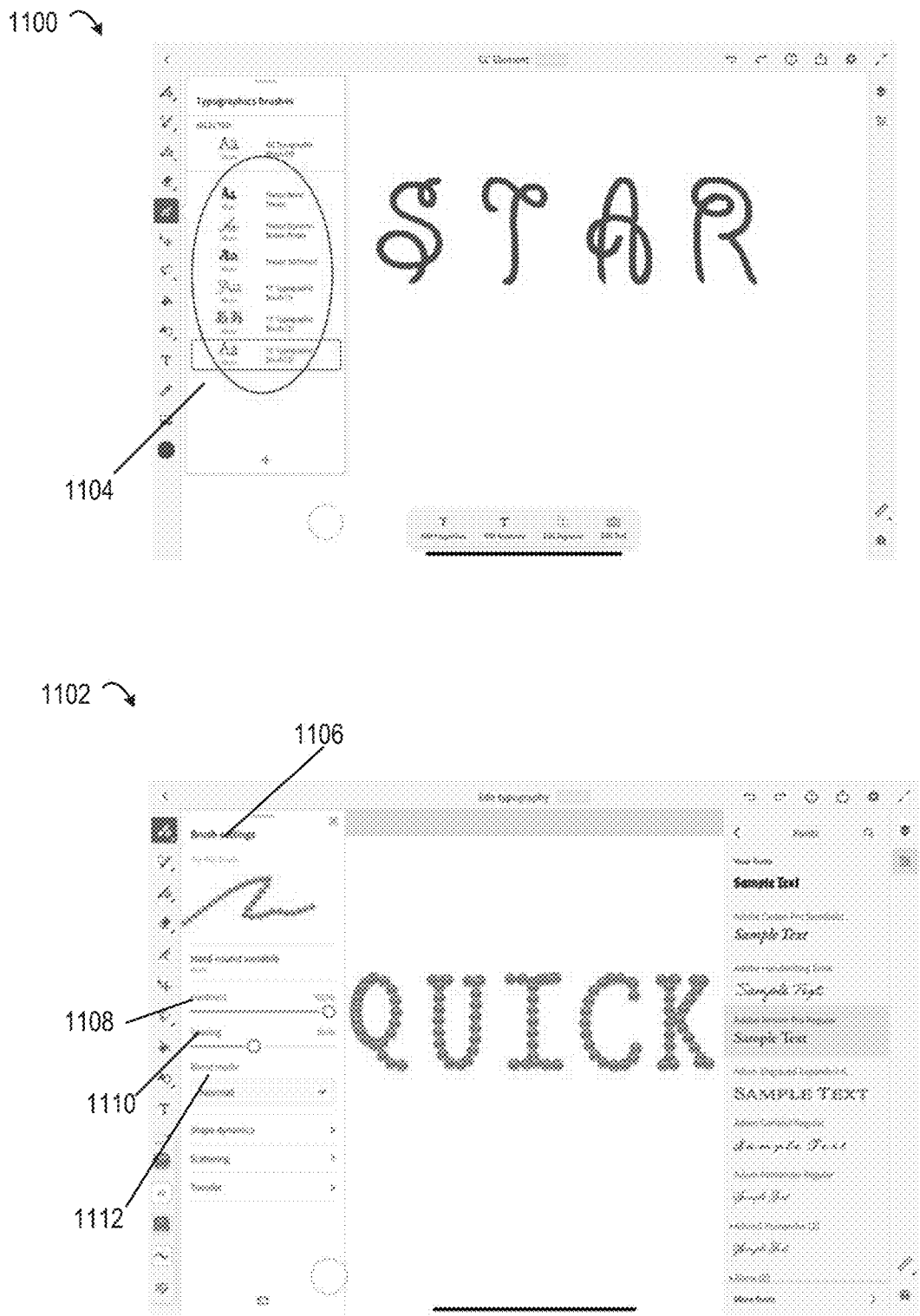
FIG. 11 depicts an example of a set of user interfaces for editing rendered glyphs, according to some embodiments.

FIG. 11 depicts an example of a set of user interfaces 1100 and 1102 for editing rendered glyphs, according to some embodiments. The user interface 1100 shows the word "STAR" being edited by a user. As illustrated, a type character selector 1104 is positioned on the left side of the user interface 1100. The user is presented with various options to select different type characters using the type character selector 1104. Type characters presented by the type character selector 1104, in some examples, are generated and saved by performing operations similar or identical to the blocks 302, 304, 306, and 308 of the process 300. Selecting a different type character of the type character selector 1104 will apply properties of the selected type character to the word "STAR" in the user interface 1100.

The user interface 1102 shows the word "QUICK" being edited by a user. As illustrated, a brush settings selector 1106 is positioned on the left side of the user interface 1102. Various settings are presented by the brush settings selector 1106 such as a hardness slider 1108, a spacing slider 1110, and a blend mode setting 1112. Adjusting the hardness slider 1108, the spacing slider 1110, the blend mode setting 1112, a combination thereof, or other settings within the brush settings selector 1106 will yield changes to the word "QUICK" in the user interface 1102.

Figure 12:
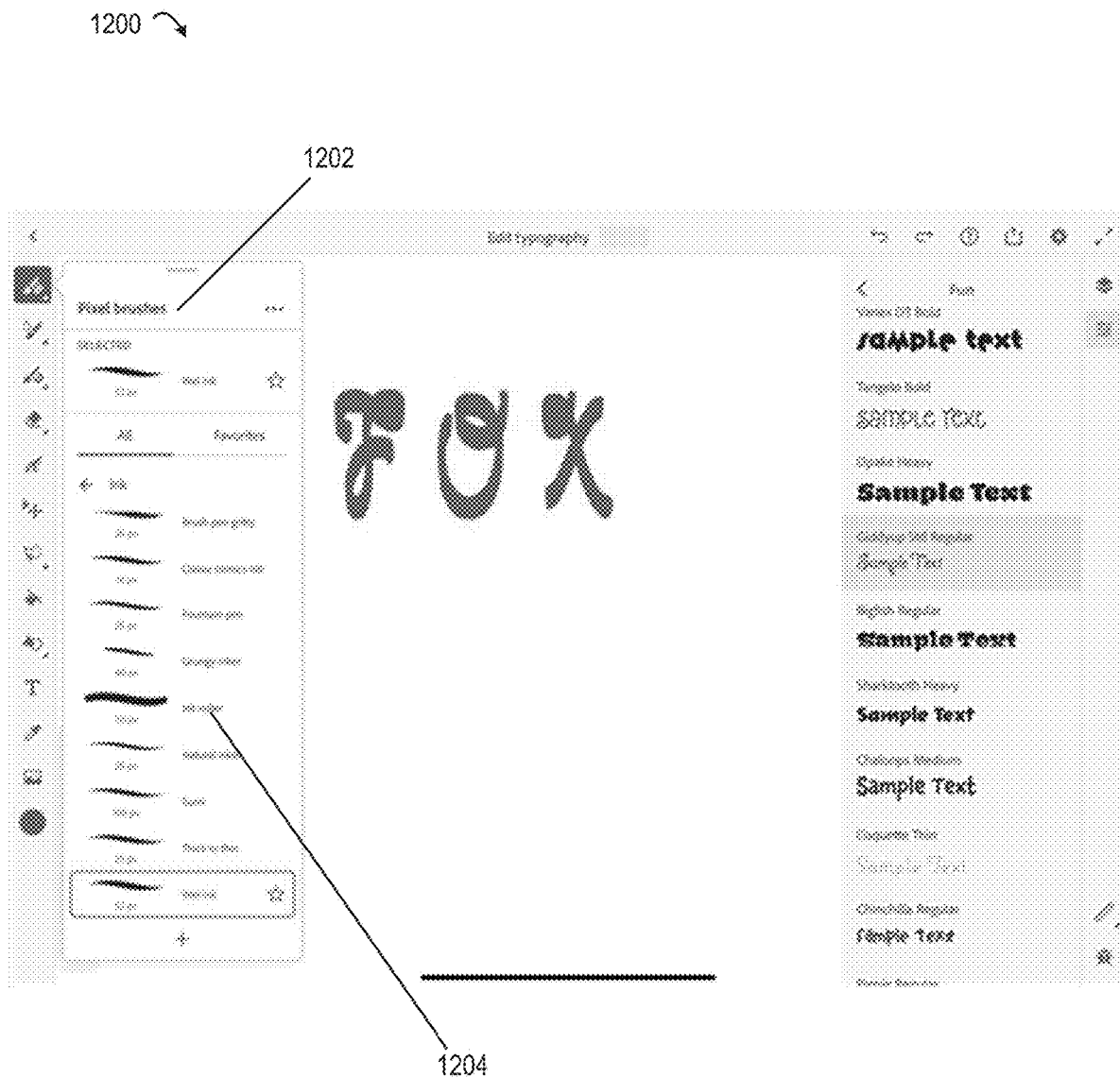
FIG. 12 depicts an example of a user interface for editing rendered glyphs, according to some embodiments.

FIG. 12 depicts an example of a user interface 1200 for editing rendered glyphs, according to some embodiments. The user interface 1200 includes the word "FOX" being edited by the user. As illustrated, a brush-type selector 1202 is positioned on the left side of the user interface 1200. Various types of pixel brushes are presented by the brush-type selector 1202. Selecting a different types of pixel brushes, in some examples, changes brush properties of the word "FOX." For example, choosing the pixel brush type of ink roller 1204 will increase the pressure property of strokes included in the word "FOX" among other potential property changes. In some embodiments, the various types of pixel brushes presented and offered by the brush-type selector 1202 are associated with various saved type characters.

Figure 13:
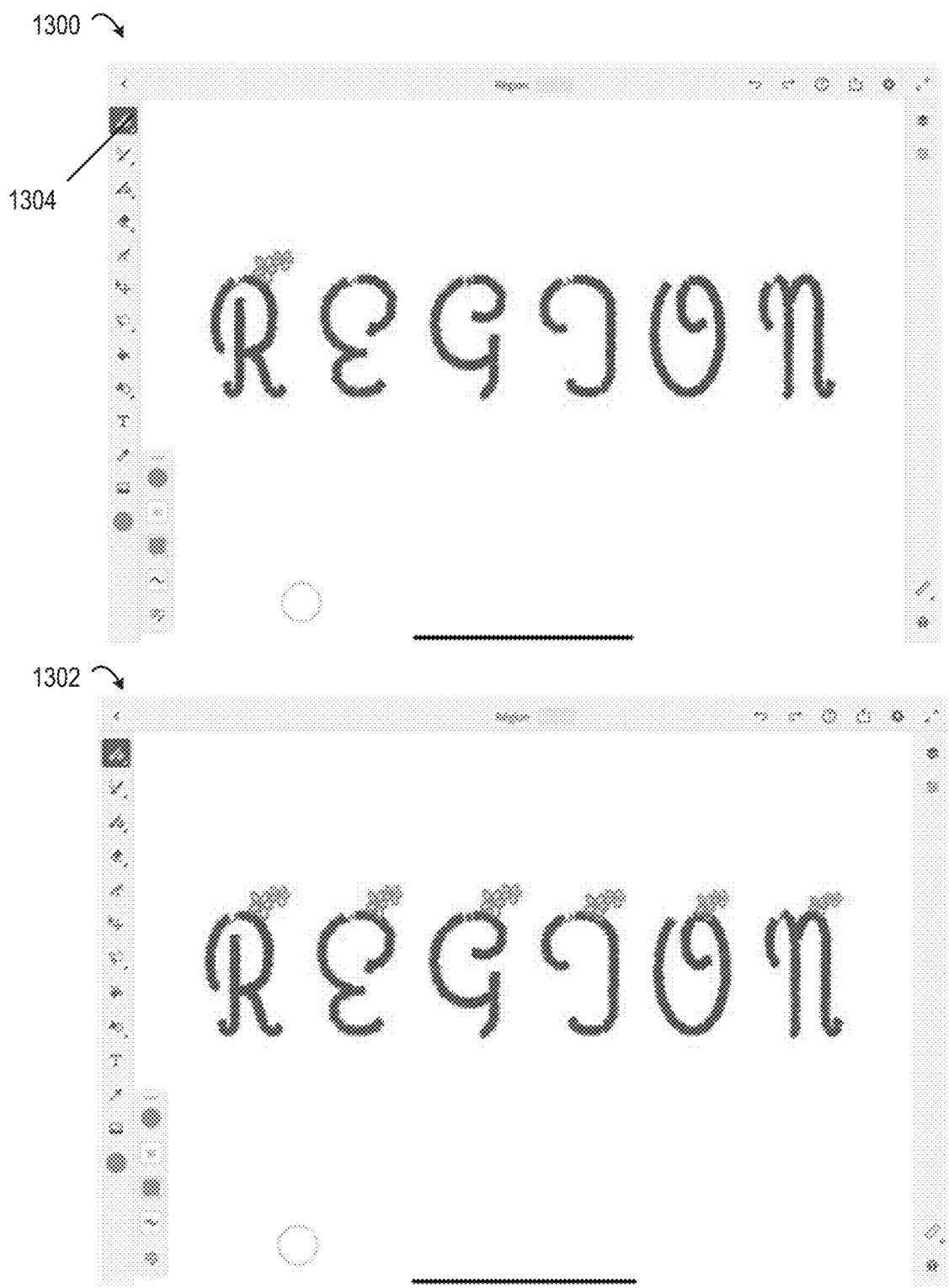
FIG. 13 depicts an example of a user interface for adding region-based edits rendered glyphs, according to some embodiments.

FIG. 13 depicts an example of a user interface 1300 for adding region-based edits in rendered glyphs, according to some embodiments. The user interface 1300 shows the word "REGION" being edited by the user. As illustrated, a floral design is present on the "R" of the word "REGION." In some examples, the user selects an option to propagate the floral design to each of the other letters within the word "REGION." As shown in the user interface 1300, a propagation option 1302 is shown in the upper-left portion of the user interface 1300. Selecting the propagation option 1302 will propagate the floral design, or other selected design element, to the other letters. A user interface 1304 shows a result of selecting the propagation option 1302 in this example. In certain embodiments, the propagation option 1302 is applied to a portion of glyphs contained within a selected word in the user interface 1300.

Example of a General Computing Environment

Figure 14:
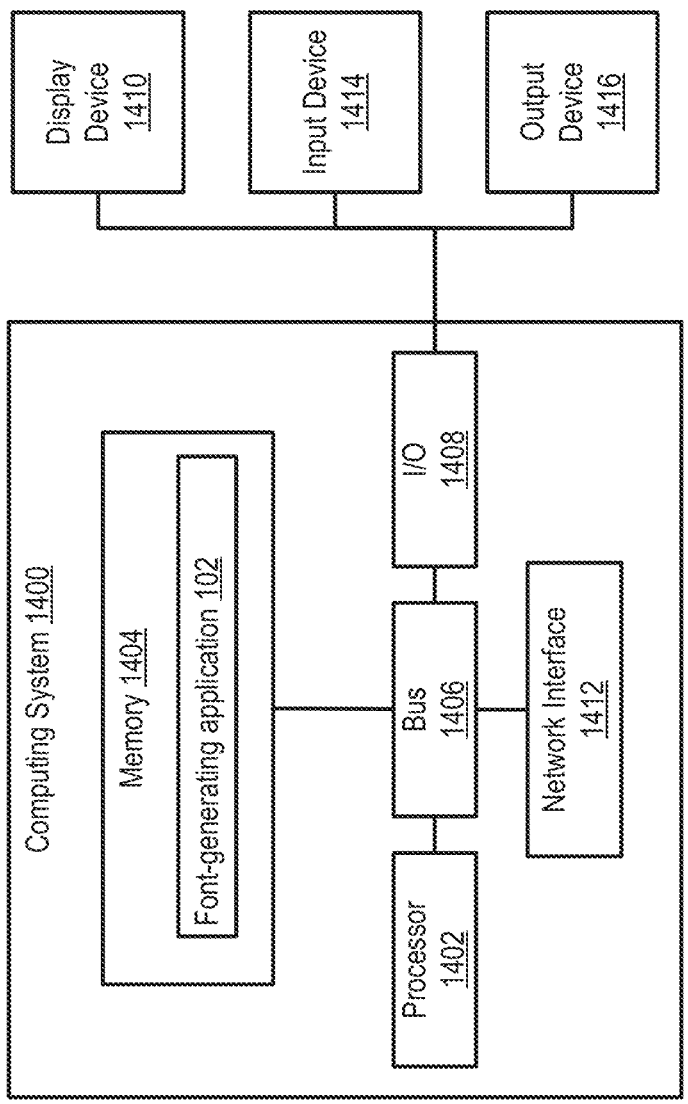
FIG. 14 depicts a computing system configured for font customization based on stroke properties in accordance with some embodiments.

Any suitable computing system or group of computing systems can be used for performing the operations described herein. For example, FIG. 14 depicts a computing system 1400 that can implement any of the computing systems or environments discussed above. In some embodiments, the computing system 1400 includes a processing device 1402 that executes the font-generating application 112, a memory that stores various data computed or used by the font-generating application 112, an input device 1414 (e.g., a mouse, a stylus, a touchpad, a touchscreen, etc.), and an output device 1416 that presents output to a user (e.g., a display device that displays graphical content generated by the font-generating application 112). For illustrative purposes, FIG. 14 depicts a single computing system on which the font-generating application 112 is executed, and the input device 1414 and output device 1416 are present. But these applications, datasets, and devices can be stored or included across different computing systems having devices similar to the devices depicted in FIG. 14.

The example of FIG. 14 includes a processing device 1402 communicatively coupled to one or more memory devices 1404. The processing device 1402 executes computer-executable program code stored in a memory device 1404, accesses information stored in the memory device 1404, or both. Examples of the processing device 1402 include a microprocessor, an application-specific integrated circuit ("ASIC"), a field-programmable gate array ("FPGA"), or any other suitable processing device. The processing device 1402 can include any number of processing devices, including a single processing device.

The memory device 1404 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions could include processor-specific instructions generated by a compiler or an interpreter from code written in any suitable computer-programming language, including, for example, C, C++, C#, Visual Basic, Java, Python, Perl, JavaScript, and ActionScript.

The computing system 1400 could also include a number of external or internal devices, such as a display device 1410, or other input or output devices. For example, the computing system 1400 is shown with one or more input/output ("I/O") interfaces 1408. An I/O interface 1408 can receive input from input devices or provide output to output devices. One or more buses 1406 are also included in the computing system 1400. Each bus 1406 communicatively couples one or more components of the computing system 1400 to each other or to an external component.

The computing system 1400 executes program code that configures the processing device 1402 to perform one or more of the operations described herein. The program code includes, for example, code implementing the font-generating application 112 or other suitable applications that perform one or more operations described herein. The program code can be resident in the memory device 1404 or any suitable computer-readable medium and can be executed by the processing device 1402 or any other suitable processor. In some embodiments, all modules in the font-generating application 112 are stored in the memory device 1404, as depicted in FIG. 14. In additional or alternative embodiments, one or more of these modules from the font-generating application 112 are stored in different memory devices of different computing systems.

In some embodiments, the computing system 1400 also includes a network interface device 1412. The network interface device 1412 includes any device or group of devices suitable for establishing a wired or wireless data connection to one or more data networks. Non-limiting examples of the network interface device 1412 include an Ethernet network adapter, a modem, and/or the like. The computing system 1400 is able to communicate with one or more other computing devices (e.g., a computing device that receives inputs for font-generating application 112 or displays outputs of the font-generating application 112) via a data network using the network interface device 1412.

An input device 1414 can include any device or group of devices suitable for receiving visual, auditory, or other suitable input that controls or affects the operations of the processing device 1402. Non-limiting examples of the input device 1414 include a touchscreen, stylus, a mouse, a keyboard, a microphone, a separate mobile computing device, etc. An output device 1416 can include any device or group of devices suitable for providing visual, auditory, or other suitable sensory output. Non-limiting examples of the output device 1416 include a touchscreen, a monitor, a separate mobile computing device, etc.

Although FIG. 14 depicts the input device 1414 and the output device 1416 as being local to the computing device that executes the font-generating application 112, other implementations are possible. For instance, in some embodiments, one or more of the input device 1414 and the output device 1416 include a remote client-computing device that communicates with the computing system 1400 via the network interface device 1412 using one or more data networks described herein.

General Considerations

Numerous specific details are set forth herein to provide a thorough understanding of the claimed subject matter.

However, those skilled in the art will understand that the claimed subject matter could be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages could be used to implement the teachings contained herein in software to be used in programming or configuring a computing device.

Embodiments of the methods disclosed herein can be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values could, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, could readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

What is claimed is:

1. A computer-implemented method comprising:
    generating, by a font-generating application, a text layer that presents a glyph set on a user interface, wherein the glyph set includes one or more glyphs;
    in response to the text layer presenting the glyph set on the user interface, receiving, by the font-generating application and via a stroke input on a typographic layer presented on the user interface, strokes that trace a visual appearance of the one or more glyphs of the glyph set presented on the text layer, wherein the typographic layer is overlaid over the text layer;
    determining, by the font-generating application, stroke properties for the strokes, respectively, wherein a stroke property for a stroke of the strokes includes values identifying at least one of a pressure, a velocity, a direction, or an azimuth of the stroke, and wherein determining the stroke properties includes comparing a first pixel position identified from a stroke flow corresponding to one of the strokes and a second pixel position of a glyph from the glyph set rendered over the text layer;
    constructing, by the font-generating application, a new glyph set from the stroke properties; and
    applying, by the font-generating application, the new glyph set to render, on the user interface, one or more type characters that match a visual appearance of the new glyph set.

2. The computer-implemented method of claim 1, further comprising:
    generating, by the font-generating application, a data structure that includes the stroke properties; and
    storing, by the font-generating application, the data structure at a first system, wherein the new glyph set is constructed at a second system by retrieving the data structure from the first system.

3. The computer-implemented method of claim 1, further comprising:
    generating, by the font-generating application, a deformed coordinate system defined by a path of the strokes and a width of the strokes;
    determining, by the font-generating application and for each new glyph of the new glyph set, a skeletal structure for the new glyph based on positions of the strokes relative to the deformed coordinate system; and
    applying a thinning algorithm to each stroke of the strokes to identify stroke points corresponding to the skeletal structure.

4. The computer-implemented method of claim 3, further comprising determining, by the font-generating application, a stroke flow for the each new glyph of the new glyph set by identifying a smallest cost path for connecting the stroke points corresponding to the skeletal structure.

5. The computer-implemented method of claim 1, further comprising:
    receiving, by the font-generating application, additional strokes that trace the visual appearance of the glyph set, wherein the additional strokes are received for modifying the new glyph set; and
    selecting a region of a new glyph of the new glyph set; and
    modifying the new glyph by applying the additional strokes to modify the selected region.

6. The computer-implemented method of claim 5, wherein the identifying of the region of the new glyph includes identifying a structure type of the region.

7. A system comprising:
    one or more data processors; and
    a non-transitory computer-readable storage medium containing instructions which, when executed on the one or more data processors, cause the one or more data processors to perform actions comprising:
        generating a text layer that presents a glyph set on a user interface, wherein the glyph set includes one or more glyphs;
        in response to the text layer presenting the glyph set on the user interface, receiving, via a stroke input on a typographic layer presented on the user interface, strokes that trace a visual appearance of the one or more glyphs of the glyph set presented on the text layer, wherein the typographic layer is overlaid over the text layer;

determining stroke properties for the strokes, respectively, wherein determining the stroke properties includes comparing a first pixel position identified from a stroke flow corresponding to one of the strokes and a second pixel position of a glyph from the glyph set rendered over the text layer;

constructing a new glyph set from the stroke properties; and applying the new glyph set to render, on the user interface, one or more type characters that match a visual appearance of the new glyph set.

8. The system of claim 7, wherein a stroke property of the stroke properties includes values identifying at least one of a pressure, a velocity, a direction, or an azimuth of a corresponding stroke.

9. The system of claim 7, wherein the instructions further cause the one or more data processors to perform actions comprising:

generating a data structure that includes the stroke properties; and parsing the data structure to construct the new glyph set.

10. The system of claim 7, wherein constructing the new glyph set from the stroke properties includes applying the stroke properties to one or more skeletal structures identified from the one or more glyphs of the glyph set, and wherein the stroke properties are applied to the one or more skeletal structures by:

for each stroke of the strokes:
identifying a stroke flow for the stroke; and
comparing the stroke flow with a subsection of a skeletal structure.

11. The system of claim 10, wherein the stroke flow is identified using a smallest cost path for connecting stroke points of the subsection of the skeletal structure.

12. The system of claim 7, wherein the instructions further cause the one or more data processors to perform operations comprising:

receiving a second stroke input comprising additional strokes; and modifying the new glyph by applying the additional strokes to modify a region of a new glyph of the new glyph set.

13. The system of claim 12, wherein the region of the new glyph is identified by determining a glyph anatomy of the new glyph.

14. A computer program product tangibly embodied in a non-transitory machine-readable storage medium including instructions configured to cause one or more data processors to perform actions including:

generating a text layer that presents a glyph set on a user interface, wherein the glyph set includes one or more glyphs;

in response to the text layer presenting the glyph set on the user interface, receiving, via a stroke input on a typographic layer presented on the user interface, strokes that trace a visual appearance of the one or more glyphs of the glyph set presented on the text layer, wherein the typographic layer is overlaid over the text layer;

a step for constructing a new glyph set comprising one or more new glyphs by identifying stroke properties from the strokes, wherein a subsection of a new glyph of the new glyph set is generated from the stroke properties, and wherein determining the stroke properties includes comparing a first pixel position identified from a stroke flow corresponding to one of the strokes and a second pixel position of a glyph from the glyph set rendered over the text layer; and generating one or more type characters that match a visual appearance of the new glyph set.

15. The computer program product of claim 14, wherein the stroke properties include values identifying at least one of a pressure, a velocity, a direction, or an azimuth of a stroke of the strokes.

16. The computer program product of claim 14, wherein the instructions further the one or more data processors to perform actions including:

storing the new glyph set is as a font file, and transmitting, to another device, the font file to allow the other device to generate the one or more type characters.

17. The computer program product of claim 14, wherein:

the stroke input is generated using a first input-operation type; and the one or more type characters are configured to be generated by a second input-operation type, wherein the first input-operation type is different from the second input-operation type.

* * * * *